United States Patent
Kim et al.

(10) Patent No.: US 12,321,716 B2
(45) Date of Patent: Jun. 3, 2025

(54) APPARATUS AND METHOD FOR GENERATING RANDOM NUMBERS BASED ON REINFORCEMENT LEARNING

(71) Applicant: AhnLabCloudMate, Inc., Seoul (KR)

(72) Inventors: Keun Jin Kim, Seoul (KR); Kyung Min Kim, Seoul (KR); Sung Ju Park, Seoul (KR)

(73) Assignee: AhnLabCloudMate, Inc., Seoul (KR)

( * ) Notice: Subject to any disclaimer, the term of this patent is extended or adjusted under 35 U.S.C. 154(b) by 953 days.

(21) Appl. No.: 17/351,940

(22) Filed: Jun. 18, 2021

(65) Prior Publication Data

US 2022/0129248 A1   Apr. 28, 2022

Related U.S. Application Data

(63) Continuation of application No. PCT/KR2020/014859, filed on Oct. 29, 2020.

(30) Foreign Application Priority Data

Oct. 28, 2020   (KR) .......................... 10-2020-0141583

(51) Int. Cl.
   *G06F 7/58*   (2006.01)
(52) U.S. Cl.
   CPC ........................... *G06F 7/58* (2013.01)
(58) Field of Classification Search
   CPC .......................................................... G06F 7/58
   See application file for complete search history.

(56) References Cited

U.S. PATENT DOCUMENTS

| | | | |
|---|---|---|---|
| 12,159,218 B1* | 12/2024 | Gai | G06N 3/063 |
| 2021/0264679 A1* | 8/2021 | Liu | G06F 18/214 |
| 2022/0076095 A1* | 3/2022 | Qin | G06N 3/04 |

FOREIGN PATENT DOCUMENTS

| KR | 10-2016-0107041 A | 9/2016 |
|---|---|---|
| KR | 10-2019-0077067 A | 7/2019 |

(Continued)

OTHER PUBLICATIONS

Pasqualini, L. et al., "Pseudo random number generation: A reinforcement learning approach." 1912.11531. 2019. (Year: 2019).*

(Continued)

*Primary Examiner* — Andrew Caldwell
*Assistant Examiner* — Markus Anthony Villanueva
(74) *Attorney, Agent, or Firm* — Studebaker Brackett PLLC

(57) ABSTRACT

Provided are an apparatus and method for generating random numbers based on reinforcement learning. The method is implemented with a computer, and includes: generating a first random number based on a deep learning-based first model through an agent unit; calculating respective similarities between at least one previously stored second random number and the first random number; performing reinforcement learning based on generative behavior of the first random number of the agent unit based on the respective similarities; and storing the first random number in a memory. The performance of the reinforcement learning is configured to provide compensation information based on the respective similarities to the agent unit through an environment unit, and then to control the agent unit to learn the first model based on the first random number.

11 Claims, 3 Drawing Sheets

(56) References Cited

FOREIGN PATENT DOCUMENTS

| KR | 10-2020-0093910 A | 8/2020 | | |
|---|---|---|---|---|
| KR | 10-2020-0103494 A | 9/2020 | | |
| WO | WO-2018083672 A1 | * | 5/2018 | ............. G06N 3/006 |

OTHER PUBLICATIONS

Pasqualini, L. et al., "Pseudo Random Number Generation: A Reinforcement Learning Approach." GitHub. pasqualini2019prngrl. Oct. 27, 2020. (Year: 2020).*

Apprey-Hermann, Joseph Kwame. "Evaluating The Predictability Of Pseudo-Random Number Generators Using Supervised Machine Learning Algorithms". Youngstown State University. May 2020. (Year: 2020).*

De Bernardi, Marcello, et al., "Pseudo-random number generation using generative adversarial networks." ECML PKDD 2018 Workshops: Nemesis 2018, UrbReas 2018, SoGood 2018, IWAISe 2018, and Green Data Mining 2018, Dublin, Ireland, Sep. 10-14, 2018, Proceedings 18. Springer International Publishing. (Year: 2019).*

Wen, Y. et al., (2019), "Machine learning-resistant pseudo-random number generator". Electron. Lett., 55: 515-517. https://doi.org/10.1049/el.2019.0485 (Year: 2019).*

Gargesa, Padmashri, "Reward-driven Training of Random Boolean Network Reservoirs for Model-Free Environments" (2013). Dissertations and Theses. Paper 669. https://doi.org/10.15760/etd.669 (Year: 2013).*

Miyazaki, Kazuteru, "A Study of an Indirect Reward on Multi-agent Environments," Procedia Computer Science, vol. 88, 2016, pp. 94-101, ISSN 1877-0509, https://doi.org/10.1016/j.procs.2016.07.411. (Year: 2016).*

Office Action issued in KR 10-2020-0141583; mailed by the Korean Intellectual Property Office on Dec. 9, 2020.

The extended European search report issued by the European Patent Office on Jun. 20, 2022, which corresponds to European Patent Application No. 20931692.6 and is related to U.S. Appl. No. 17/351,940.

Luca Pasqualini et al.; "Pseudo Random Number Generation: a Reinforcement Learning approach"; arxiv.org; Cornell University Library; Dec. 15, 2019; total 13 pages; XP081566080; Ithaca, NY.

Luca Pasqualini et al.; "Pseudo Random Number Generation: a Reinforcement Learning approach"; Procedia Computer Science; Elsevier; Apr. 9, 2020; pp. 1122-1127; vol. 170; XP086134129, ISSN: 1877-0509; Amsterdam, NL.

* cited by examiner

APPARATUS AND METHOD FOR GENERATING RANDOM NUMBERS BASED ON REINFORCEMENT LEARNING

CROSS-REFERENCE TO RELATED APPLICATION

The present application is a continuation of International Patent Application No. PCT/KR2020/014859, filed on Oct. 29, 2020, which is based upon and claims the benefit of priority to Korean Patent Application No. 10-2020-0141583 filed on Oct. 28, 2020. The disclosures of the above-listed applications are hereby incorporated by reference herein in their entirety.

BACKGROUND

1. Technical Field

The present disclosure relates to an apparatus and method for generating random numbers based on reinforcement learning.

2. Description of Related Art

A random number is a number that does not have a specific order or rule. Such random numbers are used in various computational fields as well as in offline applications. For example, a random number may be used to select the winner of a pre-completion home ownership or a prize drawing event. Recently, random numbers have also been used to issue One Time Passwords (OTP), a user authentication method using one-time passwords of randomly generated numbers.

However, there is a limit to generating such random numbers. In particular, in the case of a computer calculating a predetermined value according to a predetermined input, an unconscious choice cannot be forced like in the case of a human, so there is a limit to generating a random number. To this end, a method of generating a random number based on a seed value is commonly used, but this method also has a drawback in that the same random number may be generated by the same seed value.

Accordingly, there is a need for a method in which different random numbers can be generated with the same seed value. In particular, a method for generating random numbers using a deep learning-based generative model has not yet been proposed so that the rules inherent in the process of generating random numbers are not recognized.

Reinforcement learning is learning, from an agent, what action is best to take in the current state. Each time an action is taken, compensation is given from the environment, and the agent learns the direction which should be taken to maximize compensation. A method of learning to collect a seed value so that a random number different from an existing random number is ultimately generated by utilizing such reinforcement learning to collect a seed value necessary to generate a random number has not yet been proposed, either.

SUMMARY

Various aspects of the present disclosure are directed to providing an apparatus and method for generating random numbers based on reinforcement learning.

The aspects of the present disclosure are not limited to those mentioned above, and other aspects may be present.

A method for generating dynamic random numbers based on reinforcement learning according to an aspect of the present disclosure is implemented with a computer, and includes: generating a first random number based on a deep learning-based first model through an agent unit; calculating respective similarities between at least one previously stored second random number and the first random number; performing reinforcement learning based on generative behavior of the first random number of the agent unit based on the respective similarities; and storing the first random number in a memory. The performance of the reinforcement learning is configured to provide compensation information based on the respective similarities to the agent unit through an environment unit, and then to control the agent unit to learn the first model based on the first random number, wherein the first random number is generated by applying at least one first input value to the first model, and even when the same first input value is applied to the first model, different random numbers may be generated according to a learning state of the first model.

In an embodiment of the present disclosure, the calculation of the similarities may include performing a calculation by applying the at least one second random number and the first random number to a deep learning-based second model.

In an embodiment of the present disclosure, the similarities calculated by a second model may be calculated based on a distance between features of each of the at least one second random number and the first random number.

In an embodiment of the present disclosure, the compensation information may be provided when all of the respective similarities are lower than a first threshold.

In an embodiment of the present disclosure, the at least one previously stored second random number may include at least one random number generated based on an input value collected from a same source as a source of the input value used to generate the first random number.

An apparatus for generating dynamic random numbers based on reinforcement learning according to another aspect of the present disclosure may include: an agent unit generating a first random number based on a deep learning-based first model; an environment unit calculating each similarity between at least one previously stored second random number and the first random number and provides a compensation information to an agent unit based on the similarity; and a memory storing the first random number. After providing the compensation information corresponding to the similarity, the agent unit is controlled to learn a first model based on the first random number. The agent unit may generate the first random number by applying at least one first input value to the first model, and even when the same first input value is applied to the first model, the first random number may be generated as different random numbers according to a learning state of the first model.

In an embodiment of the present disclosure, the environment unit may apply at least one previously stored second random number and a first random number to a deep learning-based second model to calculate similarities.

In an embodiment of the present disclosure, the environment unit may calculate a distance between features of each of the at least one second random number and the first random number, and calculate the similarities based on the calculated distance.

In an embodiment of the present disclosure, the environment unit may provide compensation information to the agent unit when all of the respective calculated similarities are lower than a first threshold.

In an embodiment of the present disclosure, the at least one previously stored second random number may include at least one random number generated based on an input value collected from the same source as the source of the input value used to generate the first random number.

A computer-readable recording medium storing a program for executing a method for generating dynamic random numbers based on reinforcement learning in combination with a computer, which is hardware, according to another aspect of the present disclosure includes, based on the program: generating a first random number based on a deep learning-based first model through an agent unit; calculating respective similarities between at least one previously stored second random number and the first random number; performing reinforcement learning based on generative behavior of the first random number of the agent unit based on the respective similarities; and storing the first random number in a memory. The performance of the reinforcement learning is configured to provide compensation information based on the respective similarities to the agent unit through an environment unit, and then to control the agent unit to learn the first model based on the first random number, wherein the first random number is generated by applying at least one first input value to the first model, and even when the same first input value is applied to the first model, different random numbers may be generated according to a learning state of the first model.

In an embodiment of the present disclosure, the calculation of the similarities may include performing a calculation by applying the at least one second random number and the first random number to a deep learning-based second model.

In an embodiment of the present disclosure, the similarities calculated by a second model may be calculated based on a distance between features of each of the at least one second random number and the first random number.

In an embodiment of the present disclosure, the compensation information may be provided when all of the respective similarities are lower than a first threshold.

In an embodiment of the present disclosure, the at least one previously stored second random number may include at least one random number generated based on an input value collected from the same source as the source of the input value used to generate the first random number.

Other specific details of the present disclosure are included in the detailed description and drawings.

According to various aspects of the present disclosure described above, by comparing a previously stored random number with the generated random number and providing a compensation according to the similarities through reinforcement learning, the agent generates a random number with a low similarity to the previously stored random number. Therefore, a random number different from the stored random number can be repeatedly generated.

In addition, by generating a random number based on a deep learning-based generative model, it is possible to prevent a third party from inferring a rule inherent in the random number generation process.

The advantages of the present disclosure are not limited to the above-mentioned advantages, and other advantages, which are not specifically mentioned herein, will be clearly understood by those skilled in the art from the following description.

DETAILED DESCRIPTION

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments provided so that this disclosure will be thorough and complete and will fully convey the scope of the present disclosure to those skilled in the technical field to which the present disclosure pertains, and the present disclosure will only be defined by the appended claims.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein indicate existence of one or more other elements other than stated elements but do not exclude presence of additional elements. Like reference denotations refer to like elements throughout the specification. As used herein, the term "and/or" includes each and all combinations of one or more of the mentioned components. It will be understood that, although the terms "first", "second", etc., may be used herein to describe various components, these components should not be limited by these terms. These terms are only used to distinguish one component from another component. Accordingly, a first component mentioned below could be termed a second component without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, embodiments of the present disclosure will be described in detail with reference to the accompanying drawings.

Prior to the description, the meanings of the terms used in the present specification will be described briefly. However, it should be noted that the description of terms is used to help the understanding of the present specification, but is not to be used to limit the technical spirit of the present disclosure in the case where the limitative details of the present disclosure are not explicitly described.

The term "reinforcement learning" used in the present disclosure is a type of machine learning algorithm consisting of a state, an action, a compensation, an agent, and an environment. This reinforcement learning aims to find out what actions the agent who acts as a learning subject needs to take to receive more compensations.

Figure 1:
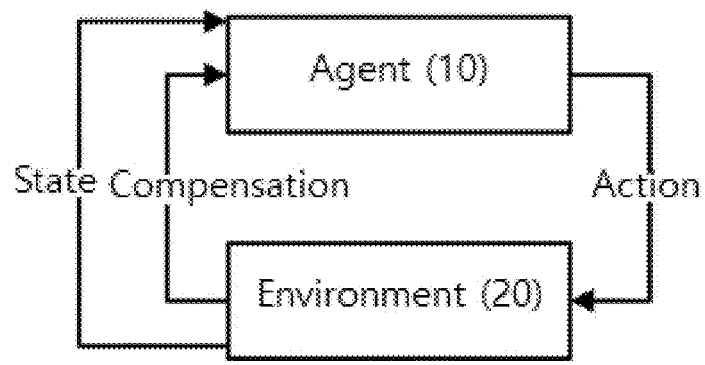
FIG. 1 is a block diagram illustrating the configuration of a reinforcement learning apparatus.

FIG. 1 is a block diagram illustrating the configuration of a reinforcement learning apparatus. Referring to FIG. 1, the agent learns a method on how to determine an action through learning of the reinforcement learning model, and when each action affects a state, the degree of success may be measured as a compensation.

In other words, the compensation is a compensation score for an action determined by the agent 10 according to a certain state when learning is performed through a reinforcement learning model, and is a type of feedback for the decision-making of the agent 10 according to learning. Through reinforcement learning, the agent takes action to maximize the compensation.

The present disclosure utilizes this characteristic of reinforcement learning to generate random numbers. Specifically, compensation is made whenever a random number generated through an action of an agent has a low similarity to an existing random number, thereby ultimately performing reinforcement learning so that the agent generates a random number different from the existing random number.

Hereinafter, embodiments of the present disclosure described above will be described in detail with reference to the accompanying drawings.

Figure 2:
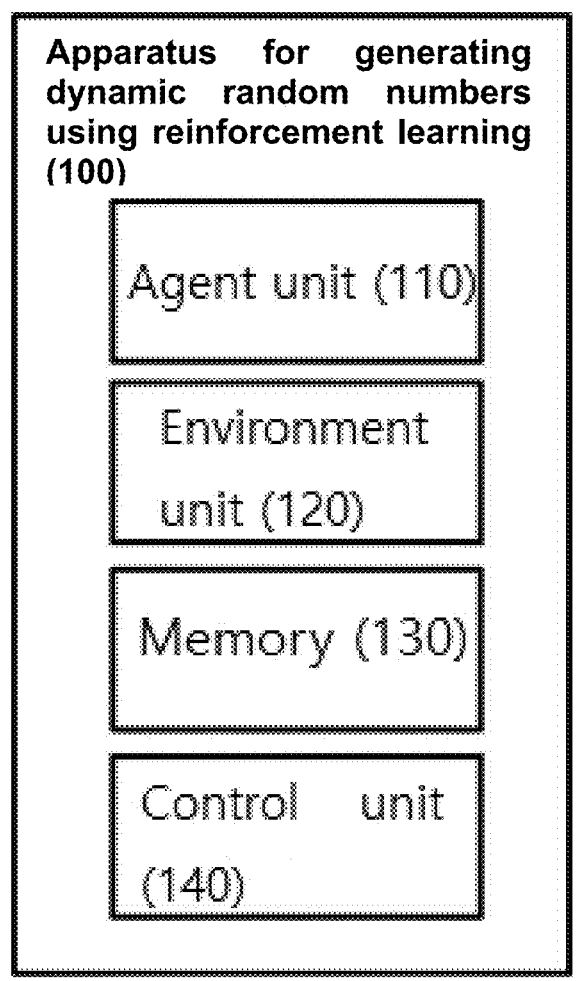
FIG. 2 is a block diagram of an apparatus for generating random numbers based on reinforcement learning according to the present disclosure.

FIG. 2 is a block diagram of an apparatus for generating random numbers based on reinforcement learning according to the present disclosure.

Referring to FIG. 2, an apparatus for generating random numbers based on reinforcement learning 100 (hereinafter, a random number generating apparatus) includes an agent unit 110, an environment unit 120, a memory 130, and a control unit 140.

The apparatus for generating random numbers based on reinforcement learning 100 of the present disclosure may include more or fewer components than those illustrated in FIG. 2. For example, the agent unit 110 may further include a collection unit for collecting a first input value corresponding to a seed value for generating a first random number.

The term "unit" used herein refers to a software element or a hardware element such as FPGA or ASIC and performs any role. However, the term "unit" is not limited to software or hardware. The "unit" may be constituted as a storage medium that may be addressed or may be constituted to control one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database, data structures, tables, arrays, and parameters. Functions provided in elements and "units" may be combined as the smaller number of elements and "units" or may be separated as additional elements and "units."

In addition, all "units" of the present specification may be controlled by at least one processor, and at least one processor may perform operations performed by the "units" of the present disclosure.

Embodiments of the present disclosure may be described in terms of blocks which carry out a described function or functions. These blocks, which may be referred to herein as units or modules or the like, are physically implemented by analog or digital circuits such as logic gates, integrated circuits, microprocessors, microcontrollers, memories, passive electronic components, active electronic components, optical components, hardwired circuits, or the like, and may optionally be driven by firmware and/or software.

The random number generating apparatus 100 may mean a server device managed by a company providing a service based on random number generation, or may mean a server device managed by a company providing a cloud computing service.

The memory 130 stores data supporting various functions of the random number generating apparatus 100. For example, data relating to one or more second random numbers that compares similarities with the first random numbers generated by the agent unit is stored. In addition, the memory 140 may store a plurality of application programs (or applications) driven in the random number generating apparatus 100, and data commands for the operation of the random number generating apparatus 100. At least some of these application programs may be downloaded from an external server through wireless communication.

In addition, the memory 130 may store an algorithm for a deep learning-based second model which is used to calculate the similarity between the first random number and the second random number by the algorithm related to the deep learning-based first model used by the agent unit 110 to generate the first random number and the environment unit.

Hereinafter, a method for generating a random number using reinforcement learning by the random number generating apparatus 100 including the agent unit 110, the environment unit 120, and the memory 130 will be described in detail.

Figure 3:
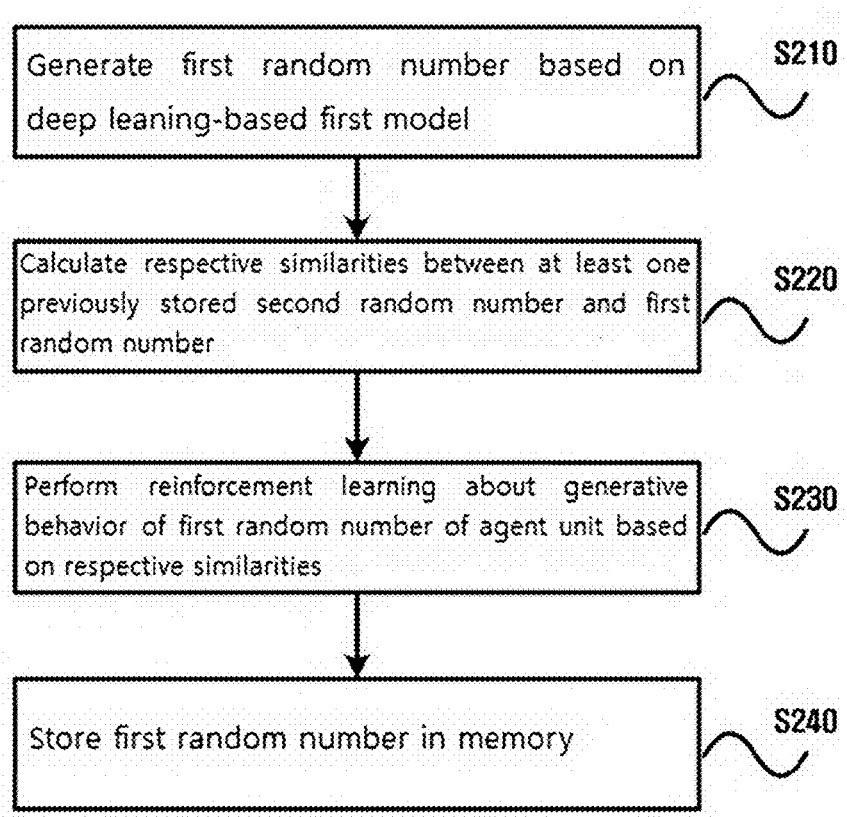
FIG. 3 is a flowchart schematically illustrating a method for generating random numbers based on reinforcement learning according to the present disclosure.

FIG. 3 is a flowchart schematically illustrating a method for generating random numbers based on reinforcement learning according to the present disclosure.

Figure 5:
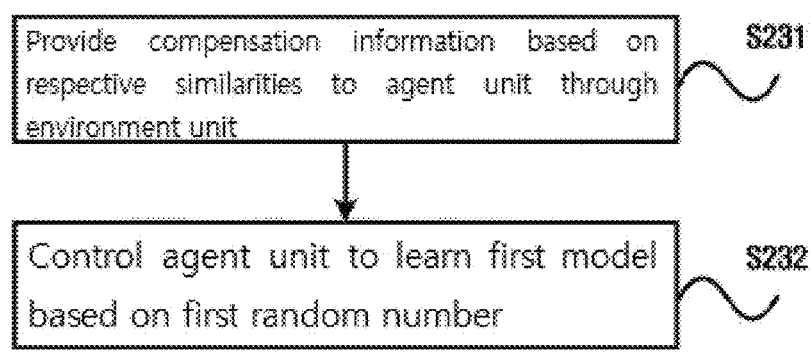
FIG. 5 is a flowchart schematically illustrating a method for reinforcing a collection action of an agent unit based on a similarity according to the present disclosure.

The operations illustrated in FIGS. 3 and 5 may be understood to be performed by a server that is a random number generating apparatus operated by a service provider for generating random numbers, but is not limited thereto.

First, referring to FIG. 3, the agent unit 110 generates a first random number based on a deep learning-based first model (S210).

Although not clearly shown in the drawing, the random number generating apparatus 100 may collect a seed value for generating the first random number through the agent unit 110. To this end, the random number generating apparatus 100 may further include a collection unit including a communication module capable of receiving a seed value.

A variable having random characteristics generated by hardware and software may be used as the seed value.

Here, hardware means a random number generating apparatus based on reinforcement learning. As described above, when the random number generating apparatus based on reinforcement learning is a server device, hardware means a server device.

Variables having random characteristics generated by hardware include a time, a time when hardware is turned on, a number of clocks in a CPU memory, and a temperature. When the apparatus for generating random numbers based on reinforcement learning receives or collects such information as a first input value used for generating a random number, the agent unit generates a random number based on the first input value.

Alternatively, the first input value may be collected by a system kernel log. Here, the system kernel log means a log file recorded at the operating system level when a program is executed.

In other words, in summary, the agent unit 110 collects a seed value for random number generation through hardware information such as a temperature, a time, and a number of clocks in a CPU memory, and a system kernel log, or performs an action for generating a first random number based on the first input value.

The first random number generated by the agent unit 110 is generated using a deep learning-based first model. In the process of generating the first random number, by using a deep learning-based generative model (Black Box), a third party cannot infer or recognize the regularity inherent in the process of generating the first random number.

In one embodiment of the present disclosure, the first random number may be adjusted to match a preset random number size. Specifically, the size of the first random number may be adjusted according to a hash function or a padding technique.

Referring back to FIG. 3, when the first random number is generated by the agent unit 110, the environment unit calculates a similarity between at least one previously stored second random number and the first random number (S220).

In one embodiment of the present disclosure, the environment unit 120 may perform a calculation by applying the at least one second random number and the first random number to a deep learning-based second model. For example, assuming that the stored second random number has three values, the similarity of each of the one first random number and the three second random numbers is calculated. As a result, values related to the three similarities are calculated. As described above, the values related to the three similarities may be calculated by the deep learning-based second model.

In one embodiment of the present disclosure, the similarity calculated by a second model may be calculated based on a distance between features of each of at least one second random number and the first random number. In other words, when the features of the first random number and the second random number are generated by the deep learning-based second model, the distance between the features of the first random number and the second random number is calculated. Then, based on the distance, a similarity is calculated.

For example, assuming that the similarity between the first random number and three second random numbers is calculated, the features of the first random number and each of the second random numbers are generated based on a deep learning-based second model, and a similarity is calculated based on the distance information of the generated features. The similarity increases as the distance between the features increases. In other words, it is determined that the first random number and the second random number having a close distance are more similar.

In addition, as a method of calculating the similarity, at least one random number stored in the memory 130 including the first random number is embedded into a vector corresponding to each random number. In addition, the cosine similarity between the vector corresponding to the first random number and the vector corresponding to each random number stored in the memory 130 is calculated.

More specifically, the similarity may be calculated using a cosine value between a vector corresponding to the first random number in the inner product space and a vector corresponding to each random number stored in the memory.

Alternatively, the above-described similarity may be measured by extracting each feature map of the first random number and at least one previously stored random number, embedding each feature map as an n-dimensional vector (where n is a natural number of 2 or more), and measuring an Euclidean distance between each vector.

Figure 4:
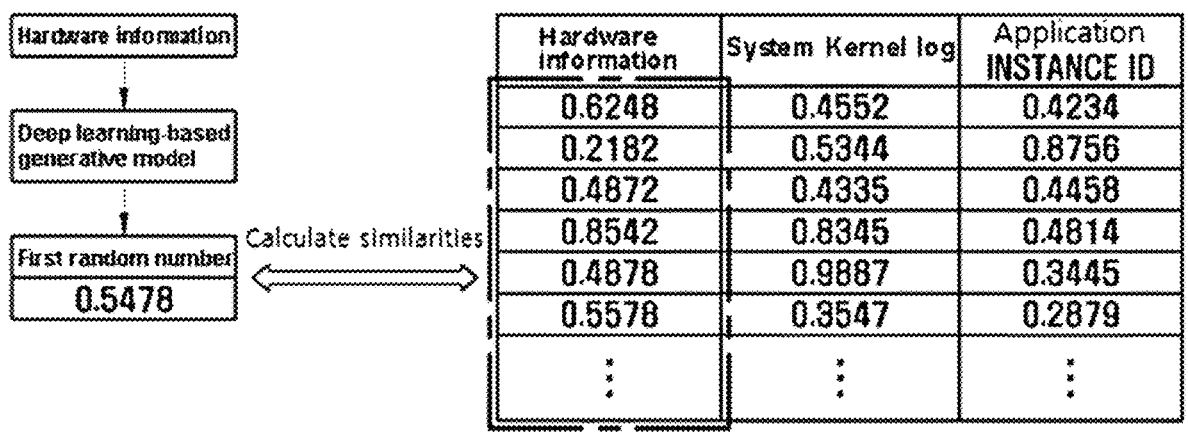
FIG. 4 is an exemplary diagram illustrating calculation of a similarity with at least one previously stored random number generated based on an input value collected from the same source as the source of the first input value corresponding to the first random number according to the present disclosure.

FIG. 4 is an exemplary diagram illustrating calculation of a similarity with at least one previously stored random number generated based on an input value collected from the same source as the source of the first input value corresponding to the first random number according to the present disclosure.

In one embodiment of the present disclosure, the at least one previously stored second random number may include at least one second random number generated based on an input value collected from the same source as the source of the input value used to generate the first random number. In other words, as described above, the first input value may be collected based on hardware information or a system kernel log. After generating a first random number based on the first input value, a similarity between at least one second random number generated based on an input value collected from the same source as the source of the first input value is calculated.

Specifically, referring to FIG. 4, it is assumed that the first input value is collected by an agent based on hardware information. When the first random number is generated by applying the first input value to the deep learning-based generative model, the environment unit will calculate a similarity between the random number previously stored in the memory and the first random number.

The environment unit does not calculate the similarity between all the existing second random numbers stored in the memory 130 and the first random number, but calculates the similarity with the second random number generated by the input value from the same source. Accordingly, the environment unit may calculate a similarity between the first random number and the second random number stored in the memory and generated based on an input value collected from hardware.

Referring back to FIG. 3, after calculating each similarity, the environment unit 120 performs reinforcement learning on the action of generating the first random number of the agent unit 110 based on each similarity (S230).

FIG. 5 is a flowchart schematically illustrating a method for reinforcing a collection action of an agent unit based on a similarity according to the present disclosure.

Referring to FIG. 5, first, the environment unit provides compensation information to the agent unit based on the similarity (S231).

In one embodiment of the present disclosure, compensation information may be provided only when the similarity is lower than the first threshold. For example, it is assumed that the similarity between the first random number and ten random numbers stored in the memory is calculated.

Compensation information may be provided to the agent unit only when the values of each similarity calculated in relation to 10 previously stored random numbers are all lower than the first threshold level set in advance. Here, the compensation information may be provided as a positive (+) value when the respective similarity are all lower than the first threshold.

On the other hand, when at least one of the calculated respective similarities is greater than the first threshold, a negative (−) value is provided. In other words, when a first random number similar to the previously stored second random number is generated, a penalty may be provided to the agent unit.

Referring back to FIG. 5, after providing a compensation, the agent unit 110 controls to learn the first model based on the first random number (S232).

In other words, the agent unit 110 repeatedly performs reinforcement learning to generate a different first random number. Specifically, when the agent unit 110 receives the compensation information, it adjusts the weight value of the hidden state of the deep learning-based first model of the agent unit 110 corresponding to the compensation information. In other words, the agent unit adjusts the weight value of the hidden state of the deep learning-based first model based on the compensation information provided through the environment unit.

When a positive (+) value is compensated through the environment unit, the weight value of the hidden state of the deep learning-based first model is adjusted. While repeating this process, the advantage of continuously generating a first random number different from the stored second random number will be exhibited. Moreover, even when the same first input value collected from hardware, kernel system, or application is applied to the deep learning generative model, different random numbers may be generated according to a learning state of the deep learning generative model.

In one embodiment of the present disclosure, when a negative (−) value is compensated based on similarity, the weight value of the hidden state of the deep learning-based first model may not be adjusted.

Referring to FIG. 3, the first random number is stored in the memory 130 (S140). In other words, after the first random number is stored in the memory 130, it is again subjected to a similarity determination with another random number newly generated by an agent.

As such, the apparatus for generating random numbers based on reinforcement learning accumulates, stores, and manages random numbers, so that whenever a first random number is newly generated, the apparatus determines the similarity, and ultimately reinforces the action regarding the first random number generation of the agent.

The above-mentioned method for generating random numbers based on reinforcement learning according to one embodiment of the present disclosure may be implemented with a program (or an application) to be combined with a computer, which is hardware, and be executed and may be stored in a medium.

For the computer to read the program and execute the methods implemented with the program, the above-mentioned program may include a code encoded into a computer language such as C, C++, Java, Ruby, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a predetermined procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The storage medium may refer to a device-readable medium which stores data on a semipermanent basis rather than a medium, such as a register, a cache, or a memory, which stores data during a short moment. In detail, the storage medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the computer or various storage media on the computer of the user. In addition, the medium may be distributed to a computer system connected over a network and may store a computer-readable code on a distributed basis.

The above description of the present disclosure is provided for the purpose of illustration, and it would be understood by those skilled in the technical field to which the present disclosure pertains that various changes and modifications may be made without changing technical ideas or essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

DESCRIPTION OF REFERENCE NUMERALS

100: RANDOM NUMBER GENERATING APPARATUS
110: AGENT UNIT
120: ENVIRONMENT UNIT
130: MEMORY

What is claimed is:

1. A method for generating dynamic random numbers based on reinforcement learning, the method being implemented with a computer, wherein the method comprises:
generating a first random number based on hardware information of the computer, using a deep learning-based first model;
calculating a similarity between a previously stored second random number, which was generated based on the hardware information of the computer, and the first random number;
performing reinforcement learning based on generative behavior of the first random number, based on the calculated similarity; and
storing the first random number in a memory,
wherein the performing of the reinforcement learning is configured to provide compensation information based on the calculated similarity, and then to control to learn the deep learning-based first model based on the first random number,
wherein the first random number is generated by applying a first input value to the deep learning-based first model, and even when the same first input value is applied to the deep learning-based first model, different random numbers are generated according to a learning state of the deep learning-based first model,
wherein the compensation information is provided as a positive (+) value when the calculated similarity is lower than a first threshold, and the compensation information is provided as a negative (−) value when the calculated similarity is greater than the first threshold, wherein the performing of the reinforcement learning comprises:

performing an adjustment of a weight value of a hidden state of the deep learning-based first model, in response to the compensation information of the positive (+) value, so that the different random numbers are generated; and performing no adjustment of the weight value of the hidden state of the deep learning-based first model, in response to the compensation information of the negative (−) value, and wherein the performing of the reinforcement learning is repeated when the compensation information of the positive (+) value is provided, until the compensation information of the negative (−) value is provided.

2. The method of claim 1, wherein the similarity is calculated by applying the second random number and the first random number to a deep learning-based second model.

3. The method of claim 2, wherein the similarity calculated by the deep learning-based second model is calculated based on a distance between features of the second random number and the first random number.

4. The method of claim 1, wherein the similarity is calculated by extracting each feature map of the second random number and the first random number, embedding each feature map as an n-dimensional vector, where n is a natural number of 2 or more, and measuring an Euclidean distance between each vector of the feature map.

5. The method of claim 1, wherein the similarity is calculated by embedding each of the second random number and the first random number into a vector corresponding to each random number, and calculating the similarity between the vector corresponding to the second random number and the vector corresponding to the first random number.

6. An apparatus for generating dynamic random numbers based on reinforcement learning, the apparatus comprising:
a processor configured to:
generate a first random number based on hardware information of the apparatus, using a deep learning-based a deep learning-based first model;
calculate a similarity between a previously stored second random number, which was generated based on the hardware information of the apparatus, and the first random number, and provides compensation information based on the calculated similarity-respective similarities; and
a memory configured to store the first random number,
wherein the processor is further configured to, after the compensation information is provided, perform learning of the deep learning-based first model based on the first random number,
wherein the processor is further configured to generate the first random number by applying a first input value to the deep learning-based first model, and even when the same first input value is applied to the deep learning-based first model, the first random number is generated as different random numbers according to a learning state of the deep learning-based first model,
wherein the compensation information is provided as a positive (+) value when the calculated similarity is lower than a first threshold, and the compensation information is provided as a negative (−) value when the calculated similarity is greater than the first threshold, wherein the processor is further configured to:
perform an adjustment of a weight value of a hidden state of the deep learning-based first model, in response to the compensation information of the positive (+) value, so that the different random numbers are generated; and
perform no adjustment of the weight value of the hidden state of the deep learning-based first model, in response to the compensation information of the negative (−) value, and
wherein the reinforcement learning is repeated when the compensation information of the positive (+) value is provided, until the compensation information of the negative (−) value is provided.

7. The apparatus of claim 6, wherein the processor is further configured to apply the previously stored second random number and the first random number to a deep learning-based second model, to calculate the similarity.

8. The apparatus of claim 7, wherein the processor is further configured to calculate a distance between features of the second random number and the first random number, and calculates the similarity based on the calculated distance.

9. A non-transitory computer-readable storage medium storing a program for executing a method for generating dynamic random numbers based on reinforcement learning in combination with a computer hardware, the program includes instructions to perform:
generating a first random number based on hardware information of the computer hardware, using a deep learning-based first model;
calculating a similarity between a previously stored second random number, which was generated based on the hardware information of the computer hardware, and the first random number;
performing reinforcement learning based on generative behavior of the first random number, based on the calculated similarity; and
storing the first random number in a memory,
wherein the performing of performance of the reinforcement learning is configured to provide compensation information based on the calculated similarity, and then to control learning of the deep learning-based first model based on the first random number,
wherein the first random number is generated by applying a first input value to the deep learning-based first model, and even when the same first input value is applied to the deep learning-based first model, different random numbers are generated according to a learning state of the deep learning-based first model,
wherein the compensation information is provided as a positive (+) value when the calculated similarity is lower than a first threshold, and the compensation information is provided as a negative (−) value when the calculated similarity is greater than the first threshold,
wherein the performing of the reinforcement learning comprises:
performing an adjustment of a weight value of a hidden state of the deep learning-based first model, in response to the compensation information of the positive (+) value, so that the different random numbers are generated; and
performing no adjustment of the weight value of the hidden state of the deep learning-based first model, in response to the compensation information of the negative (−) value, and wherein the performing of the reinforcement learning is repeated when the compensation information of the positive (+) value is provided, until the compensation information of the negative (−) value is provided.

10. The storage medium of claim 9, wherein the similarity is calculated by applying the second random number and the first random number to a deep learning-based second model.

11. The storage medium of claim 10, wherein the similarity calculated by the deep learning-based second model is calculated based on a distance between features of the second random number and the first random number.

\* \* \* \* \*